United States Patent Office 3,667,731
Patented June 6, 1972

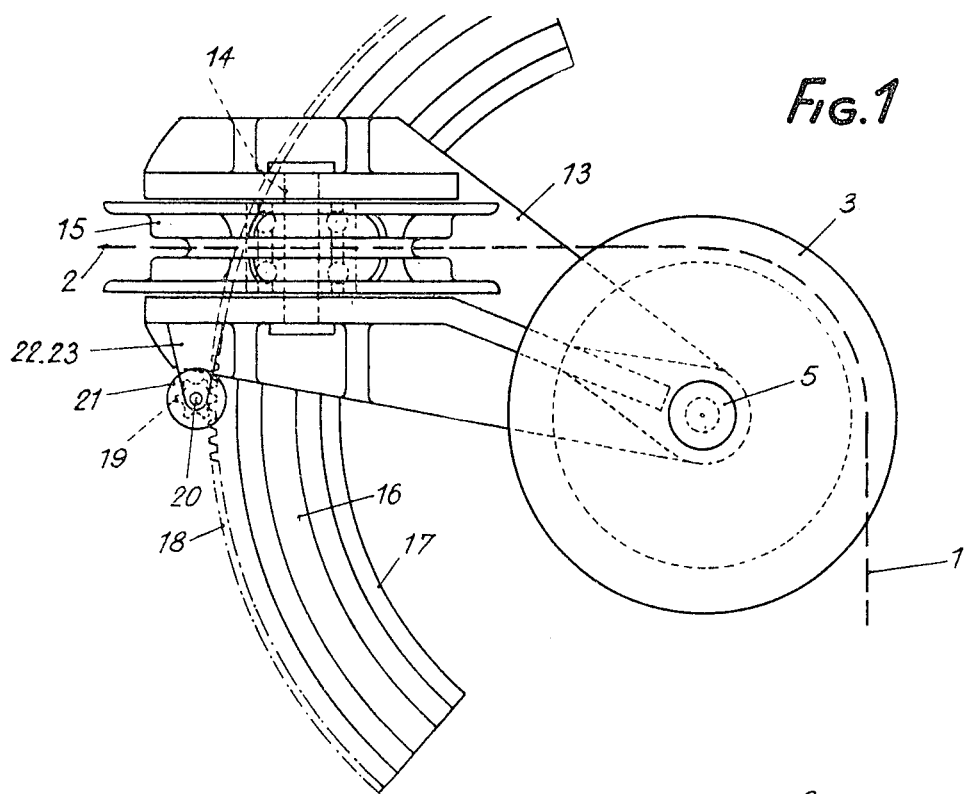
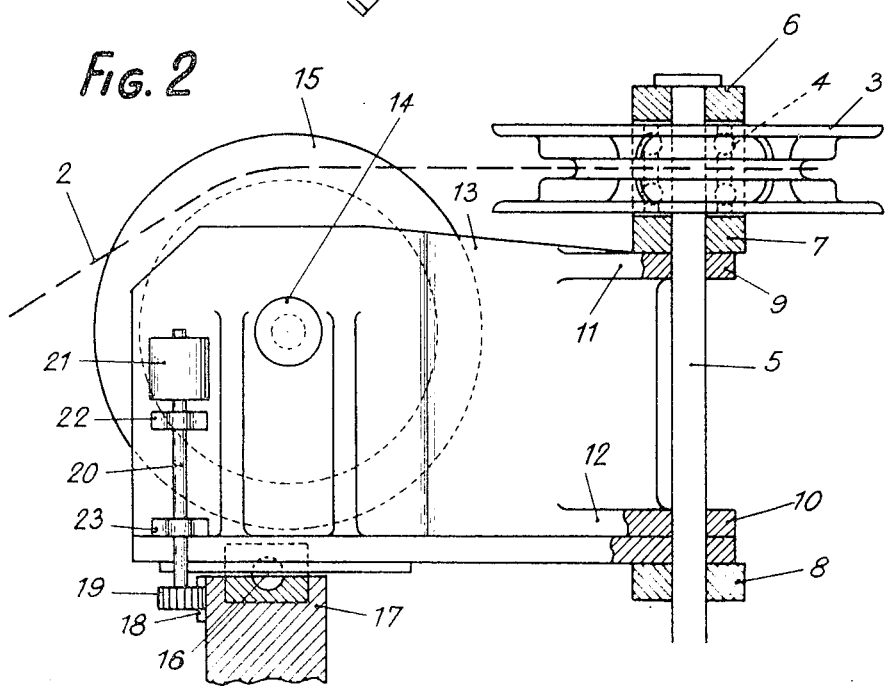

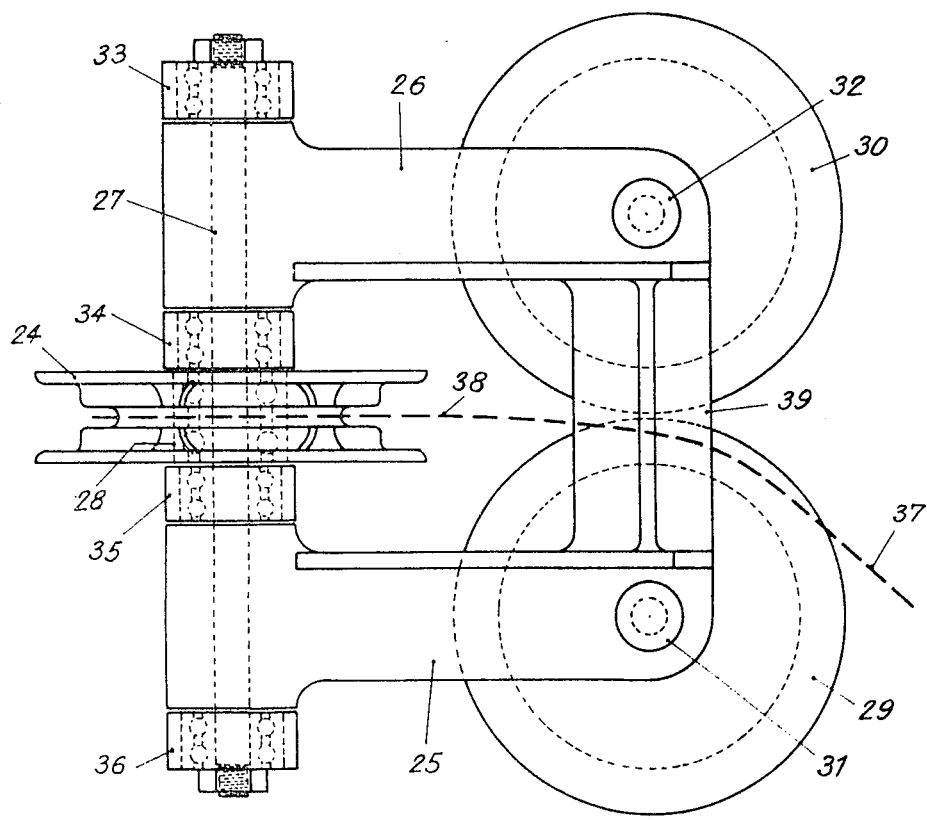

3,667,731
CHAIN GUIDING APPARATUS
Jean-Louis Corgnet, Boulogne-Billancourt, France, assignor to Compagnie Francaise des Petroles, Paris, France
Filed Dec. 11, 1969, Ser. No. 884,438
Claims priority, application France, Dec. 11, 1968, 177,682
Int. Cl. B66d 1/38
U.S. Cl. 254—190 R
1 Claim

ABSTRACT OF THE DISCLOSURE

An anchor chain guide having at least two mutually perpendicular pulleys with the bearing support of one journaled on the shaft of the other so that the central or symmetry plane of each pulley is tangent to the entry groove of the other. In one embodiment the bearing support for one of the pulleys slides on a circular track whose center coincides with the axis of the other pulley. In another embodiment the bearing support mounts a pair of tangent pulleys in the same plane and is journaled for rotation about the horizontal shaft of a third pulley. With both arrangements the anchor chain always lies in the central plane of both pulleys around which it is guided, thus eliminating lateral stresses and undue frictional wear, and preventing the chain from jumping over the pulley cheeks.

BACKGROUND OF THE INVENTION

This invention relates to a device for the guidance of chains and more particularly, for the guidance of chains that are used to moor or heave the anchors of ships.

When the stress exerted on an anchor chain is measured at the windlass it is found to be only a fraction of the real stress exerted on the chain. This difference is due to the heavy frictional forces exerted by the chain on its guide surfaces, such as the hawse-pipe, for example. These frictional forces increase as the forces exerted on the chain increase, and undergo large variations due to the scraping of the chain. In large tonnage vessels, chains are thus used having links with stays that resist not only these abrupt variations in stress, but even more so the deformations of the links caused by defective movement on the guidance surfaces.

The usual solutions to this problem are aimed at eliminating the untimely wear and tear of the elements on which the chain glides, and involve the use of rollers or pulleys. These solutions are of little use, however, where an anchored ship undergoes large swinging movements due to wind and tide. Indeed, in the case where a pulley is used on which the chain runs before it is moved along or held by the windlass, it is found that any variation in the head of the ship brings about large lateral stresses along the sides of the chain on the inside surfaces of the pulley cheeks and it is not rare for the chain to wind up scraping along or riding up over the top edge of one of the cheeks.

This frictional wear can be reduced considerably by guiding the anchor chains through devices combining a first pulley with a vertical axis, placed between the windlass and the side of the ship, and a second pulley, with a horizontal axis, mounted on a support articulated around a vertical shaft, situated between the two pulleys, with the second pulley hanging over the water surface. This solution reduces the risks of the chain jumping its pulley but does not in any way eliminate the friction of the chain against the inside of the pulley cheeks.

SUMMARY OF THE INVENTION

This invention eliminates all lateral stresses by chains on the cheeks of guide pulleys and is characterized by a first chain-pulley, a mobile support around the axle of said pulley, and at least one second chain pulley with an axle perpendicular to that of the first pulley, the plane of symmetry of the second pulley, perpendicular to its axle, being tangent to the groove of the first pulley, the latter having its plane of symmetry, perpendicular to its axle, tangent to the groove of the second pulley.

Thus a chain held or stretched on the second pulley, in any direction whatsoever, rotates the support of the pulley and necessarily enters the plane of symmetry perpendicular to the axis of the pulley. In view of the respective positions of the two pulleys, the chain also necessarily smoothly enters the plane of symmetry of the first pulley which eliminates any friction against the internal portions of the pulley cheeks. Thus, any change in the ships heading causes the rotation of the support of the second pulley and the chain, at any moment, retains a central position in the grooves of the two pulleys.

Another feature of the invention resides in a chain guide as described above, characterized by gliding or rolling means mounted on a circular track, whose center is located on the axis of the pulley with the vertical axle. In this way most of the force exerted by the chain is applied not only upon the axis of rotation of the support for the pulley with the horizontal axle but directly upon the circular track. The coincidence of the center of the track with the vertical axis of the horizontal pulley ensures that, regardless of changes in the ships heading, the symmetry plane of the vertical pulley will always remain tangent to the groove of the horizontal pulley, and vice versa.

Another feature of the invention resides in a chain guide as described above, characterized by a low power auxiliary motor for moving the support of the pulley with the horizontal axle when the latter is no longer stressed by a force sufficient to move until its plane of symmetry, perpendicular to the axle, remains constantly in the plane of the chain.

The arrangement not only permits the good presentation of the chain to the windlass during the storing of the anchor, but it also facilitates the resumption of the operation of the guidance device when the latter has been shut down as a result of a long period of anchorage.

Another embodiment of the invention consists of a guidance device having a first pulley, two arms pivoting around the axis of the pulley and each supporting a second pulley, with the planes of symmetry of the second pulleys being tangent to the groove of the first pulley that bears the links of the chain. The arms are mounted on either side of the first pulley so that its plane of symmetry is tangent to the ends of the cheeks of the second pulleys.

BRIEF DESCRIPTION OF THE DRAWINGS

In the drawings:

FIG. 1 is a top view of one embodiment of the invention;

FIG. 2 is a side view of the device of FIG. 1; and

FIG. 3 is a top view of an alternate embodiment of the invention.

DESCRIPTION OF THE PREFERRED EMBODIMENTS

For greater clarity in the drawings, only the device for the guidance of the chain has been shown. The chain is illustrated by a simple dotted line, the links themselves—of the stay-type when dealing with the anchor chains of a heavy-tonnage ship—can be of any type and have not been shown here. In FIG. 1, the end of the chain designated by 1 is assumed to be held stretched by a sprocket wheel, the end 2 being connected to the anchor.

Pulley 3, in FIGS. 1 and 2, represents a honeycomb or stay-type pulley permitting the movement of the chain without gliding. Pulley 3 turns freely around a roller bearing 4 mounted on shaft 5.

Shaft 5 may be mounted in any suitable manner on a bed having any shape and of which only three support pieces 6, 7 and 8, keeping shaft 5 in position, have been shown. Shaft 5 may rotate around its axis and supports 6–8 may include either plain bearings or roller bearings for this purpose.

Below pulley 3, between supports 7 and 8 of the bed plate, lie the reamed ends 9 and 10 of the upper and lower arms 11 and 12 of a supoprt 13. The support 13 mounts the horizontal axle 14 of pulley 15 in a suitable set of bearings. The position of pulley 3 on shaft 5 is such that its plane of symmetry perpendicular to shaft 5 is tangent to the upper portion of the groove of pulley 15, as seen in FIG. 2. Likewise, the plane of symmetry of pulley 15, perpendicular to axle 14, is tangent to the upper portion of the groove of the pulley 3, as seen in FIG. 1. Thus, regardless of the position of support 13, the portion of the chain situated between the two pulleys remains in these planes of symmetry.

In order to carry the large vertical forces transmitted by axle 14, the support 13 has a car or a system of ball bearings or roller bearings, for example, resting on the roller track 16 mounted on portion 17 of the bed plate. This roller track may be of any known type, the rail may be hollow or in relief, or it may involve a simple lubricating surface with grooves that supply the lubricant to facilitate the gliding of a friction car or shoe. Track 16 is circular and its center is the axis of shaft 5.

Support 17 may, on its outside edge, have rack teeth 18 which engage a pinion 19 mounted on shaft 20 driven by motor 21. The motor 21 is attached to support 13 and shaft 20 is guided by bearing collars 22 and 23. It is obvious that motor 21 can be of any type, the only condition being that it be capable of free rotation in the absence of power so that the support 13 can freely turn around the axis of shaft 5 under the action of the chain's tension. Thus end 2 of the chain rests in the symmetry plane of pulley 15, perpendicular to axle 14, regardless of the changes in the head of the ship. When the anchor is to be hauled back on board, after it has been raised to a certain height, motor 21 may be used to move support 13 in any desired direction. It is clear that, in the absence of the motor, the pinion 19 could be operated by a simple mechanism controlled by a manual crank.

Because of lack of space, there may be no room to provide a circular rolling track, such as 16. In this case the embodiment shown in FIG. 3 may be employed. Instead of arranging a stay-type pulley with the same vertical axis as the support of the second pulley, this embodiment includes a pulley 24 whose axis of rotation, coinciding with that of the support, is horizontal.

This support consists of two arms 25 and 26 rotatably mounted on a shaft 27 on which is mounted the bearing 28 of the pulley 24. Arms 25 and 26 have, at their ends, pulleys 29 and 30, freely turning around their axes 31 and 32, while their supports 25 and 26 turn on shaft 27 around the axis of pulley 24.

It is clear that the mountings of the pulleys or their supports around their respective axes may be of any kind whatever, regardless of whether 25 is or is not connected to 26 by means of a bridge member 39. In FIG. 3, shaft 27 turns inside bearings 33, 34, 35 and 36, belonging to any base plate or bed plate not shown.

For the sake of clarity in the drawing, it is assumed that the supports 25, 26 are in a position rendering the axes 31 and 32 of pulleys 29 and 30 vertical. This position does not correspond to the general case of mooring an anchor; the plane of the pulleys is then inclined to the horizontal as a result of the force exerted by the chain. As in the first embodiment, the symmetry plane of the pulleys 29 and 30 perpendicular to their axes 31 and 32, is tangent to the upper portion of the groove of the pulley 24. Likewise, the plane of symmetry of pulley 24, perpendicular to the axis of shaft 27, is tangent to the edges of the cheeks of pulleys 29 and 30.

At anchor, the chain, depending upon the orientation of the ship, rests on one or the other of pulleys 29 or 30 and forces their supports 25 and 26 to assume an inclined position by turning around the axis of shaft 27. Thus, regardless of the movement of the vessel, in other words, regardless of the direction and inclination of portion 37 of the chain, the latter remains in the symmetry plane perpendicular to the axis of pulley 29, whereas portion 38 remains in the symmetry plane of pulley 24. The chain cannot jump out of pulleys 29 and 30 because their cheeks are too close together.

I claim:

1. A chain guide for eliminating lateral stresses against the cheeks of guide pulleys, comprising:
   a first pulley;
   drive means for the first pulley, including a pinion and a motor capable of free rotation in the absence of power for driving the pinion;
   a circular toothed track for engaging the pinion;
   a pivoting support means for supporting the first pulley during rotational movement on the circular track;
   a semi-circular smooth track mounted traversely to and adjacent the circular toothed track;
   a roller bearing member mounted on the pivoting support means for operational contact with the semi-circular smooth track to support any pulley forces directed traversely towards the circular tooth track;
   a second pulley, and
   an axle member for mounting both the second pulley and the pivoting support means, the axle member being radially equidistant from the entire circular toothed track circumference, the second pulley having an axis perpendicular to the axis of the first pulley means, whereby each pulley has an identical grooved surface for permitting the guided passage of the chain and the plane of symmetry of each pulley is tangent to the entry groove of the other pulley.

References Cited
UNITED STATES PATENTS

| | | | |
|---|---|---|---|
| 934,809 | 9/1909 | Holmes | 254—190 R |
| 969,873 | 9/1910 | Isaac | 254—190 R |
| 1,767,737 | 6/1930 | Brown | 254—190 X |
| 2,133,406 | 10/1938 | Shelton et al. | 254—190 R X |
| 2,178,280 | 10/1939 | Hutchins et al. | 254—190 |

DUANE A. REGER, Primary Examiner

F. K. YEE, Assistant Examiner